April 18, 1933.  C. S. PRENDERGAST ET AL  1,904,629
VARIABLE SPEED GEARING
Filed Dec. 22, 1931   2 Sheets-Sheet 2
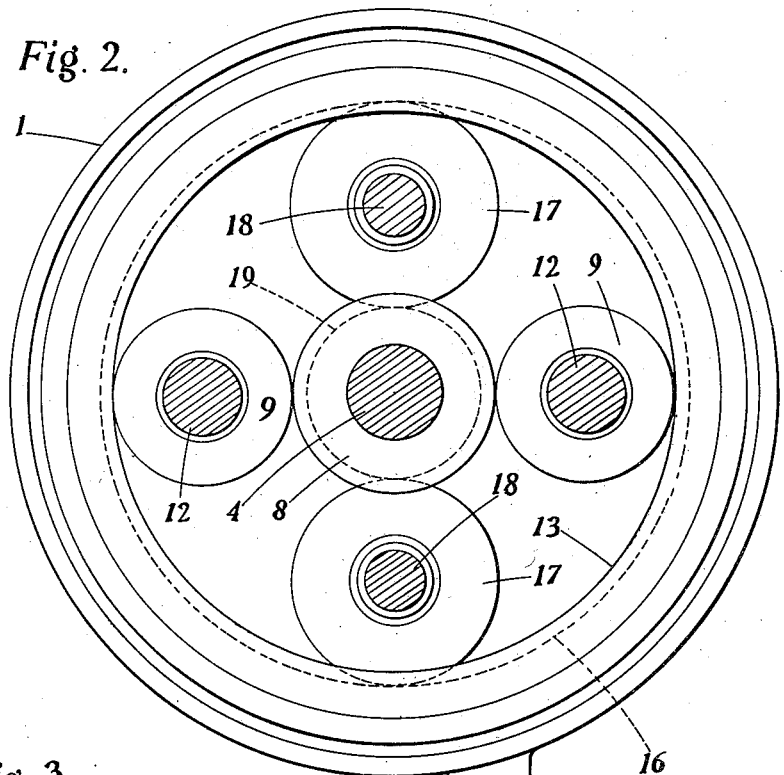
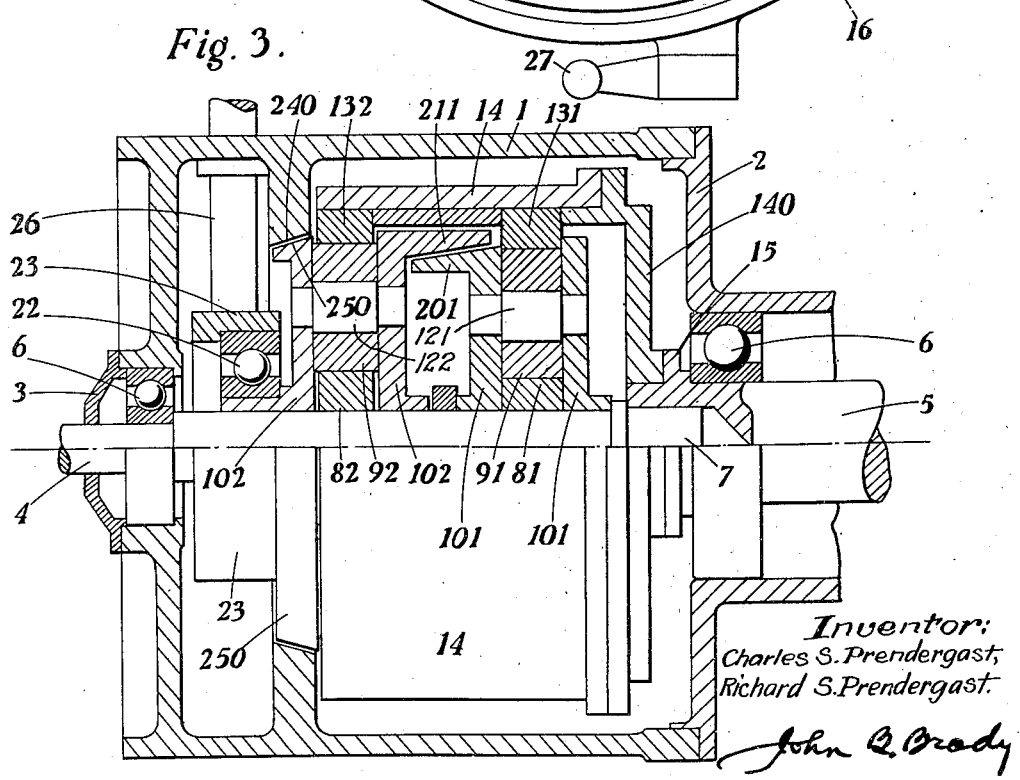
Inventor:
Charles S. Prendergast,
Richard S. Prendergast.
John Q. Brady Patented Apr. 18, 1933

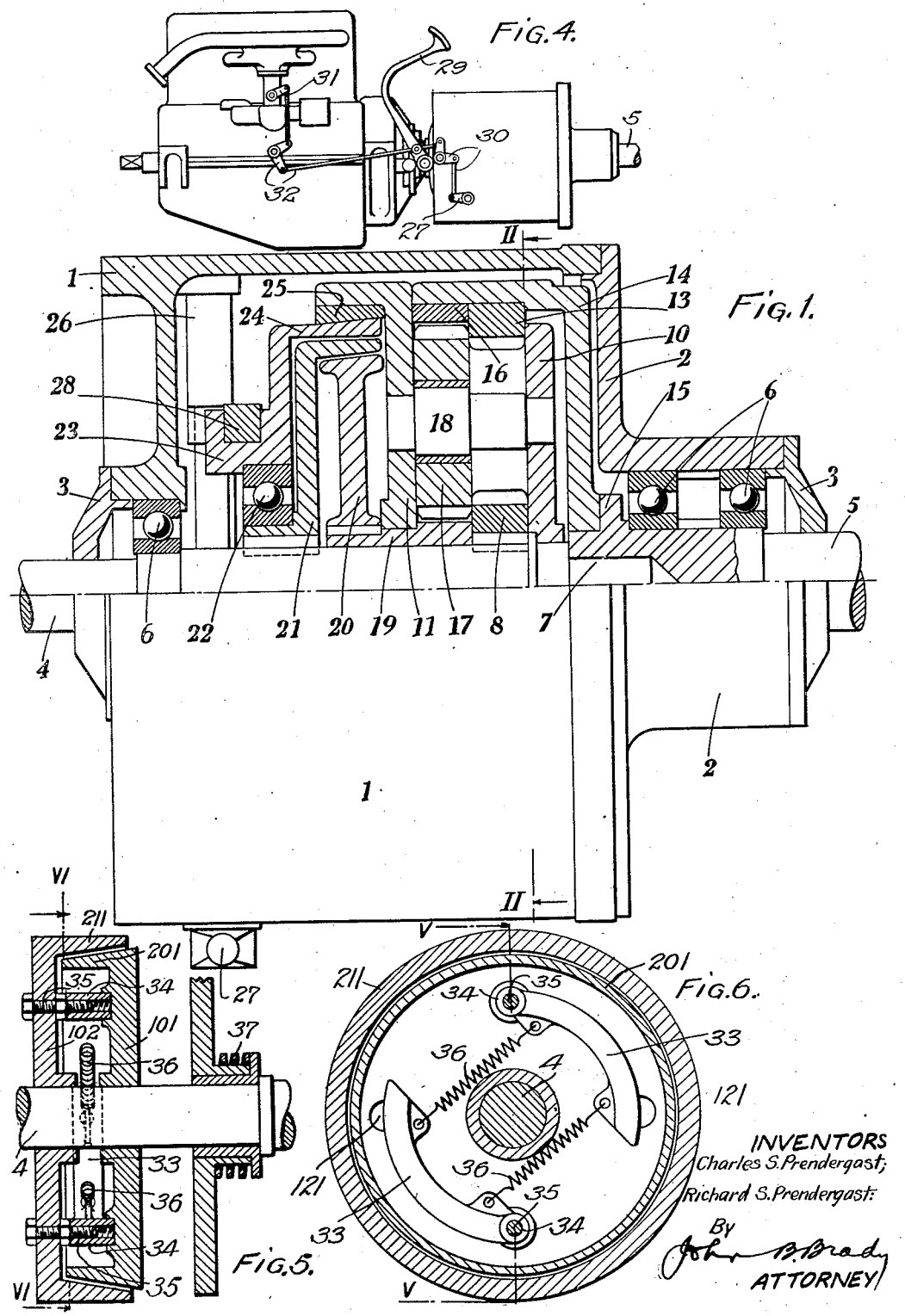

1,904,629

UNITED STATES PATENT OFFICE

CHARLES SCOTT PRENDERGAST AND RICHARD SAMUEL PRENDERGAST, OF LONDON, ENGLAND

VARIABLE SPEED GEARING

Application filed December 22, 1931, Serial No. 582,578, and in Great Britain December 24, 1930.

This invention relates to differential-epicyclic variable-speed gears of the kind in which a small variation in the relative speeds of two or more controlling elements produces a wide variation in the speed of a driven element.

A variable speed gear in accordance with our invention comprises coaxial driving and driven members, two epicyclic gear trains of different ratios, which include two sun wheels mounted on one of the members, one at least of the wheels being secured thereto, and planet wheels engaging the sun wheels and two internally toothed rings in fixed connection with the other member, and a friction clutch for variably and directly interconnecting homologous parts of the two gear trains to vary the speed of the driven member.

In one form of the gear, the planet wheels are mounted in a common cage, and the sun wheels are employed as controlling elements, one being fixed to the driving shaft the other being free thereon, and a clutch being provided for variably coupling the sun wheels to vary the speed of the driven member.

In another form the sun wheels are fixed to the driving shaft and the planet wheels are mounted in separate cages which form the controlling elements, and may be variably coupled together to vary the speed of the driven member.

Means may be provided in connection with the gear for retarding or immobilizing one or more of the elements for the purpose of reversing the drive.

It is a great advantage of the gear according to the invention that forward and reverse speed variations may all be effected by continuous movement of a single lever without the use of sliding dogs or the like.

The friction clutch means for varying the relative speeds of the controlling elements may be subject to several forms of operation.

In one form, such means may simply comprise a clutch adapted to be subjected to different degrees of engaging load by manual operation of a lever. Such manual operation may be supplemented in certain cases by mechanical loading devices interconnected with the controls of the power unit, so that while the degree of manual control may cover the same range, the maximum and minimum total loadings may be simultaneously raised or lowered in accordance with the torque of the power unit.

Means such as a centrifugal governor, may be provided under the influence of the load on the driven shaft whereby the controlling elements are constrained to such relative speed that the rotation of the driven shaft at some selected speed is maintained substantially constant.

Two embodiments of the invention will be described by way of example with reference to the accompanying drawings wherein:—

Fig. 1 is a partly sectional plan view of an embodiment for use in motor vehicles;

Fig. 2 is a diagrammatic part-section on the line II—II of Fig. 1;

Fig. 3 is a sectional plan of another embodiment;

Fig. 4 is an elevation showing the gear applied to a motor vehicle; and

Figs. 5 and 6 are side and end sectional elevations respectively of a detail modification.

In the embodiment shown in Figs. 1 and 2 of the drawings, the two sun wheels are employed as controlling elements, these wheels being constrained to rotate at varying relative speed by means of a manually operated friction clutch.

The various elements of the gear are enclosed within a cylindrical casing 1 having a cover 2 and end caps 3 so that all the moving parts are completely enclosed. The driving shaft 4 and the driven shaft 5 are supported in the casing and the cover by ball-bearings 6 and a spigot 7 on the end of the driving shaft is also journalled in a socket in the driven shaft for further support. A toothed pinion 8 acting as a sun wheel is keyed to the driving shaft 4 and engages a series of planet wheels 9 freely mounted in a planetary cage consisting of a disc 10 and a second flanged disc 11, the wheels 9 being mounted on spindles 12 journalled in these discs. (For simplification, Fig. 2 shows only two planet wheels in each of the epicyclic gear trains, but it will be obvious that any number of planet wheels may be employed as may be convenient.) The planet wheels 9 engage an internally toothed annular ring 13 which is secured within a flanged disc 14 fastened to the driven shaft by any convenient means such as a flange 15.

There is further secured within the annulus of the flanged disc 14 a second internally toothed ring 16, which engages a second series of planet wheels 17 mounted upon spindles 18 between the discs 10 and 11, which thus constitute a common cage for the planet wheels of the two trains. The planet wheels 17 engage a sun wheel 19 loosely mounted on the driving shaft 4, but rigidly connected with a male member 20 of a cone clutch. The female member 21 of this clutch is secured to the driving shaft 4 by splines or the like so that it is free to slide with limited movement axially on the shaft, but is constrained to rotate therewith. Axial movement of the clutch member is effected through a ball-bearing 22, of a type adapted to axial as well as radial thrust. One ring of this bearing engages the slidable clutch member and the other ring engages the hub 23 of a non-rotating disc having a flange 24, which flange is of frusto-conical shape and adapted to engage in certain circumstances a friction lining 25 secured within the annular flange of the disc 11 which forms part of the planetary cage. The movable controlling means, comprising the female clutch member 21 and the flanged disc 23 are operated through a shaft 26 by a lever 27, the movement of the shaft being transmitted to the controlling means by a pair of arms 28 on the shaft.

In the operation of the gear a driving torque is applied to the shaft 4. Assuming the driven shaft 5 to be stationary under a load, and the clutch members 20, 21 disengaged, the rotation of the fixed sun wheel 8 engaging with the planet wheels 9 will have the effect of rotating the planetary cage and all the planet wheels therein in the same direction as the shaft 4, but at a lower speed. This rotation, by reason of the engagement of the planet wheels 17 with the annular ring 16 causes the sun wheel 19 to rotate also in the same direction as the driving shaft. The speed of the sun wheel 19 relative to the driving shaft is dependent on the ratios of the various component gear members, and in the embodiment shown these ratios are so fixed that the sun wheel 19 rotates at a speed approximately 10% higher than the driving shaft 4. The clutch member 20 rotates with the sun wheel 19 and the clutch member 21 rotates with the driving shaft 4. There is in consequence a corresponding difference in speed between the two clutch members.

When it is desired to take up the load, the clutch member 21 is advanced by means of the lever 27 towards the clutch member 20 so that the friction surfaces thereof engage one another, but with a certain amount of slip. This engagement tends to reduce the speed of the member 20, and the sun wheel 19. In consequence of this change in the relative speed of the fixed and free sun wheels the equilibrium between the two epicyclic trains, which must necessarily exist by reason of their having planet wheels mounted in a common cage, and annular rings mounted for rotation together, is disturbed, and can only be restored by a change in the speed of rotation of the planetary cage and a certain amount of movement of the driven member 14 in the same direction as the driving shaft 4. While the slip between the clutch members remains comparatively large the speed of the free sun wheel 19 is not much reduced, and the driven shaft rotates at a low speed. As the frictional grip between the clutch members is increased, the speed of the free sun wheel 19 is continually reduced towards the speed of the driving shaft and the driven shaft correspondingly accelerated until the clutch members are completely engaged, when the whole gear locks up solid and the driving and driven shafts rotate at the same speed.

For the purpose of reversing the drive the clutch member 21 is withdrawn from engagement with the clutch member 20 and by a further movement of the arms 28 the flange 24 of the non-rotating disc 23 is brought into engagement with the friction member 25 secured to the flange disc 11 of the planetary cage. This disc 11 is thus retarded and in consequence a reversed drive is transmitted to the driven shaft 5 through the fixed sun wheel 8, the planet pinions 9 and the annular ring 13. The backward speed of the driven members is dependent on the retardation of the planetary cage and when this is completely immobilized by full engagement of the members 24 and 25 the reversed speed is a maximum.

In the embodiment shown in Fig. 3, two sun wheels 81, 82 fixed to the driving shaft engage planet wheels 91, 92 mounted in planetary cages 101, 102 upon spindles 121, 122. These planet wheels in turn respectively engage annular rings 131, 132 secured within a cylindrical member 14 which is fixed by means of a flanged disc 140 to a flange 15 on the driven shaft 5. In this embodiment the variation of speed of the driven shaft is controlled by a slipping frictional engagement of the two separate planetary cages, which for this purpose are provided with inter-engaging frusto-conical flanges 201, 211. The planetary cage 102 is mounted on the driving shaft 4 so as to be free for a small amount of axial movement and is controlled from a shaft 26 through a non-rotating member 23 and a ball-bearing 22 adapted to withstand both axial and radial thrust. One member of the planetary cage 102 has a frusto-conical extension 250 disposed to engage in certain circumstances with a corresponding surface 240 formed on the interior of the casing 1.

In operation this embodiment is substantially similar to that hereinbefore described. Assuming the driven shaft and the annular rings 131, 132 connected therewith to be at rest under a load, the rotation of the sun wheels 81, 82 with the driving shaft 4 causes the planetary cages 101, 102 to rotate in the same direction as the driving shaft, both slower than the shaft, but at different speeds. When the clutch surfaces 201, 211 are engaged by axial movement of the planetary cage 102, in order to permit the functioning of the system some rotation of the driven members is necessary. As the frictional grip of the clutch surfaces is increased the amount of this necessary rotation becomes greater, so that the gear ratio between the driving and driven shafts correspondingly decreases until when the friction surfaces are in full engagement the gear rotates as a solid whole.

For reversing, the shaft 26 is turned until the surfaces 201, 211 are completely free and the surfaces 240, 250 engage. By this engagement the rotation of the planetary cage 102 is retarded so that a reversed drive is transmitted to the shaft 5 from the sun wheel 82 through the planet wheels 92 and the annular ring 132.

The two embodiments illustrated may be varied by elimination of the external casing 1 and the cover 2, and suitable alteration of the bearings, so that power may be taken directly from the cylindrical part 14. For instance, this may be used as a pulley, hoisting drum or the like. All the gear members are completely enclosed and the devices present a smooth exterior when mounted, for example, in plummer blocks. The form shown in Fig. 1 is complete with a reversing gear when the casing is removed; a brake band may be provided to engage the flange 250 for providing reversing means when the embodiment shown in Fig. 3 is used without a casing.

It may be desirable to provide in connection with the clutch control means for varying the loading thereof in accordance with the amount of power to be transmitted. For instance, in a motor vehicle being used in town it may not be necessary to employ high torque so that the loading on the clutch may be correspondingly reduced. However, the same vehicle when in use in hilly districts or at high speed on the open road requires the transmission of maximum power and heavier loading is desirable. Conveniently, as shown in Fig. 4, the clutch control lever 27 may be interconnected with the accelerator pedal 29 of the engine so that the loading of the clutch in the gear box is increased through levers 30 simultaneously with the opening of the throttle 31, through levers 32, by the depression of the pedal 29.

For varying the engagement of the clutch members in accordance with the load on the driven shaft, a simple centrifugal governor may be included in the gear, for example, as shown in Figs. 5 and 6. Weights 33 are pivotally mounted by internally screw-threaded bosses 34 upon externally threaded studs 35 in the planetary cage 102, the bosses bearing upon the movable cage 101. With decrease of load, the tendency of the driven member 140 is to speed up and as the planetary cage 102 speeds up correspondingly the weights 33 move outwards against the action of control springs 36 and by the screw threads in the bosses 34 press the cages 101, 102 apart and thereby slacken the engagement of the clutch members so as to decrease the gear ratio and return the speed of the driven member to normal. Conversely, when the load on the driven member increases, the cage 102 is retarded and the weights 33 are pulled in by the springs 36, so that the bosses 35 are screwed back on the studs, permitting a clutch loading spring 37 to press the cages 101, 102 into closer engagement, whereby the gear ratio is increased and the driven member speeded up to normal. The centrifugal device is shown applied to the gear in Fig. 3, but obviously it may be mounted on the planetary cage 11 of the gear in Fig. 1 so as to act on the clutch member 20 slidably but non-rotatably mounted on the sleeve 19.

Any suitable materials may be employed for the various members of the gear train or of the controlling mechanism. Also, any suitable type of gears may be employed as members of the epicyclic trains; for example, friction gears may be employed as an alternative to toothed gears.

We claim :—

1. A differential epicycle variable speed gear comprising, in combination, coaxial driving and driven members, two epicyclic gear trains of different ratios including two internally toothed rings fixed to one of the said members, two sun wheels mounted on the other of the said members, one at least of the sun wheels being fixed to its member, and planetary cage members supporting planet wheels engaging the said rings and sun wheels, and means for variably and directly interconnecting homologous parts of the said two gear trains to vary the speed of the said driven member relative to the speed of the said driving member.

2. A differential epicyclic variable speed gear comprising, in combination, driving and driven members, two epicyclic gear trains of different ratios including two internally toothed rings fixed to the driven member, a sun wheel fixed to the driving member, a sun wheel freely mounted for rotation on the driving member, planet wheels mounted in common cage members and engaging the said rings and sun wheels, and means for variably and directly coupling the sun wheels.

3. A differential epicyclic variable speed gear comprising, in combination, driving and driven members, two epicyclic gear trains of different ratios including two internally toothed rings fixed to the driven member, a sun wheel fixed to the driving member, a sun wheel freely mounted for rotation on the driving member, planet wheels mounted in common cage members and engaging the said rings and sun wheels, a clutch member mounted for rotation with the free sun wheel, a clutch member mounted for rotation with the driving member and lever means for variably engaging the clutch members.

4. A differential epicyclic variable speed gear comprising, in combination, driving and driven members, two epicyclic gear trains of different ratios including two internally toothed rings fixed to one of the said members, two sun wheels fixed to the other of the said members, two planetary cages, two series of planet wheels mounted in the cages and engaging the sun wheels and the rings, and means for variably and directly coupling the planetary cages.

5. A differential epicyclic variable speed gear comprising, in combination, driving and driven members, two epicyclic gear trains of different ratios including two internally toothed rings fixed to the driven member, two sun wheels fixed to the driving member, two planetary cages, and two series of planet wheels mounted in the cages and engaging the sun wheels and the rings, coacting friction clutch members rotatable with each of the cages, and lever means for variably engaging the clutch members.

6. A differential epicyclic variable speed gear comprising, in combination, coaxial driving and driven members, two epicyclic gear trains of different ratios including two internally toothed rings fixed to one of the said members, two sun wheels mounted on the other of the said members, one at least of the sun wheels being fixed to its member, and planetary cage members supporting planet wheels engaging the said rings and sun wheels, means for variably and directly interconnecting homologous parts of the two gear trains to vary the speed of the said driven member relative to the speed of the said driving member and means for frictionally immobilizing a planetary cage member for effecting a reversed drive through one of the gear trains.

7. A differential epicyclic variable speed gear comprising, in combination, driving and driven members, two epicyclic gear trains of different ratios including two internally toothed rings fixed to the driven member, a sun wheel fixed to the driving member, a sun wheel freely mounted for rotation on the driving member, planet wheels mounted in common cage members and engaging the said rings and sun wheels, a clutch member mounted for rotation with the free sun wheel, a clutch member rotatable with the driving member, a brake surface on one of the cage members, a nonrotatable member presenting a brake surface, and lever means movable in one direction for variably engaging the clutch members and movable in the other direction for disengaging the clutch members and engaging the brake surfaces.

8. A differential epicyclic variable speed gear comprising, in combination, driving and driven members, two epicyclic gear trains of different ratios including two internally toothed rings fixed to the driven member, two sun wheels fixed to the driving member, two planetary cages, two series of planet wheels mounted in the cages and engaging the sun wheels and the rings, coacting friction clutch surfaces rotatable with the cages, a brake surface on one of the cages, a fixed member presenting a brake surface, and lever means movable in one direction for variably engaging the clutch surfaces and movable in the other direction for disengaging the clutch surfaces and engaging the brake surfaces.

9. A differential epicyclic variable speed gear comprising, in combination, driving and driven shafts, a drum secured to the driven shaft, two epicyclic gear trains of different ratios including two internally toothed rings fixed within the said drum, a sun wheel fixed to the driving shaft, a sleeve freely mounted for rotation on the driving shaft, a sun wheel secured to the said sleeve, planet wheels mounted in common cage members and engaging the said rings and sun wheels, a clutch member secured to the said sleeve, a clutch member rotatable with and movable axially upon the driving shaft, a flange on one of the cage members presenting a brake surface, a non-rotatable member movable axially with said movable clutch member and presenting a brake surface, an enveloping casing, a transverse shaft mounted in the said casing and lever means secured to the said transverse shaft and engaging the said nonrotatable member, the said transverse shaft being turnable manually in one direction for variably engaging the clutch members and in the other direction for disengaging the clutch members and engaging the brake surfaces to effect a reversed drive through one of the said gear trains.

10. A differential epicyclic variable speed gear comprising, in combination, driving and driven shafts, a drum secured to the driven shaft, two epicyclic gear trains of different ratios including two internally toothed rings fixed within the said drum, two sun wheels fixed to the driving shaft, two planetary cages, two series of planet wheels mounted in the said cages and engaging the said sun wheels and rings, flanges on the said cages presenting coacting cone clutch surfaces, a flange on one of the said cages presenting a brake surface, an enveloping casing, a transverse shaft mounted in the said casing, an annular rib in the said casing presenting a brake surface, and lever means secured to the said transverse shaft and turnable in one direction for variably engaging the clutch surfaces and in the other direction for disengaging the clutch surfaces and engaging the brake surfaces to effect a reversed drive through one of the said gear trains.

11. A differential epicyclic variable speed gear comprising, in combination, a driving shaft, a driven pulley drum, two epicyclic gear trains of different ratios including two internally toothed rings fixed within the said drum, a sun wheel fixed to the driving shaft, a sun wheel freely mounted for rotation on the driving shaft, planet wheels mounted in common cage members and engaging the said rings and sun wheels, and means for variably and directly coupling the sun wheels.

12. A differential epicyclic variable speed gear comprising, in combination, a driving shaft, a driven pulley drum, two epicyclic gear trains of different ratios including two internally toothed rings fixed within the said drum, two sun wheels fixed to the driving shaft, two planetary cages, two series of planet wheels mounted in the said cages and engaging the said sun wheels and rings, and friction clutch means for variably coupling the said cages.

13. A differential epicyclic variable speed gear comprising, in combination, a driving shaft, a driven pulley drum, two epicyclic gear trains of different ratios including two internally toothed rings within the said drum, a sun wheel fixed to the driving shaft, a sun wheel freely mounted for rotation on the driving shaft, planet wheels mounted in common cage members and engaging the said rings and sun wheels, a clutch member mounted for rotation with the free sun wheel, a clutch member rotatable with the driving shaft, a brake surface on one of the cage members, a non-rotatable member presenting a brake surface, and lever means movable in one direction for variably engaging the clutch members and movable in the other direction for disengaging the clutch members and engaging the brake surfaces.

14. A differential epicyclic variable speed gear comprising, in combination, a driving shaft, a driven pulley drum, two epicyclic gear trains of different ratios including two internally toothed rings fixed within the said drum, two sun wheels fixed to the driving shaft, two planetary cages, two series of planet wheels mounted in the said cages and engaging the said sun wheels and rings, coacting friction clutch surfaces rotatable with the cages, a brake surface on one of the cages, a fixed member presenting a brake surface, and lever means movable in one direction for variably engaging the clutch surfaces and movable in the other direction for disengaging the clutch surfaces and engaging the brake surfaces.

15. A differential epicyclic variable speed gear comprising, in combination, a driving shaft, a driven hoisting drum, two epicyclic gear trains of different ratios including two internally toothed rings fixed within the said drum, two sun wheels fixed to the driving shaft, two planetary cages, two series of planet wheels mounted in the said cages and engaging the said sun wheels and the rings, flanges on the said cages presenting coacting cone clutch surfaces, a flange on one of the said cages presenting a brake surface, supporting bearings for the said driving shaft and hoisting drum, a shaft supported transversely to the said driving shaft, a brake band axially fixed, lever means secured to said transverse shaft for variably engaging the clutch members, and means for engaging said brake surface and brake band.

16. A differential epicyclic variable speed gear comprising, in combination, a driving shaft, a driven pulley drum, two epicyclic gear trains of different ratios including two internally toothed rings fixed within the said drum, a sun wheel fixed to the driving shaft, a sun wheel freely mounted for rotation on the driving member, planet wheels mounted in common cage members and engaging the said rings and sun wheels, and centrifugal automatic means under control of the load on the said drum for variably and directly coupling the said sun wheels.

17. A differential epicyclic variable speed gear particularly for an automobile comprising, in combination, coaxial driving and driven shafts, two epicyclic gear trains of different ratios including two internally toothed rings fixed to the driven shaft, two sun wheels mounted on the driving shaft, one at least of the sun wheels being fixed to the said driving shaft, and planetary cage members supporting planet wheels engaging the said rings and sun wheels, friction clutch means for variably interconnecting homologous parts of the two gear trains to vary the speed of the driven member relative to the speed of the driving member, friction means for retarding a planetary cage member for effecting a reversed drive through one of the gear trains, and lever means for varying the engagement of said clutch means under the control of the accelerator levers of the engine.

18. A differential epicyclic variable speed gear particularly for an automobile, comprising, in combination, driving and driven shafts, a drum secured to the driven shaft, two epicyclic gear trains of different ratios including two internally toothed rings fixed within the said drum, two sun wheels fixed to the driving shaft, two planetary cages, two series of planet wheels mounted in the said cages and engaging the said sun wheels and rings, flanges on the said cages presenting coacting cone clutch surfaces, a flange on one of the said cages presenting a brake surface, an enveloping casing, a transverse shaft mounted in the said casing, an annular rib in the said casing presenting a brake surface, lever means secured to the said transverse shaft and turnable in one direction for variably engaging the clutch surfaces and in the other direction for disengaging the clutch surfaces and engaging the brake surfaces, and means for varying the loading of the said clutch surfaces under the control of the accelerator levers of the engine.

19. A differential epicyclic variable speed gear comprising, in combination, coaxial driving and driven members, two epicyclic gear trains of different ratios including two internally toothed rings fixed to one of the members, two sun wheels mounted on the other of the said members, one at least of the sun wheels being fixed to its member, and planetary cage members supporting planet wheels engaging the said rings and sun wheels, friction clutch means for variably and directly interconnecting homologous parts of the said two gear trains to vary the speed of the said driven member relative to the speed of the said driving member, and centrifugal means for automatically varying the engagement of the friction clutch means, the said centrifugal means comprising weights mounted on a planetary cage member by screw-threaded pivots serving to move the coacting members of the clutch means together or apart in accordance with the speed of rotation of the weights.

20. A differential epicyclic variable speed gear particularly for an automobile, comprising, in combination, driving and driven shafts, a drum secured to the driven shaft, two epicyclic gear trains of different ratios including two internally toothed rings fixed within the said drum, two sun wheels fixed to the driving shaft, two planetary cages, two series of planet wheels mounted in the said cages and engaging the said sun wheels and rings, flanges on the said cages presenting coacting cone clutch surfaces, a flange on one of the said cages presenting a brake surface, an enveloping casing, a transverse shaft mounted in the said casing, an annular rib in the said casing presenting a brake surface, lever means secured to the said transverse shaft and turnable in one direction for variably engaging the clutch surfaces and in the other direction for disengaging the clutch surfaces and engaging the brake surfaces, and centrifugal means for automatically varying the engagement of the clutch surfaces under the control of the load on the driven shaft for maintaining the speed of said shaft constant, the said centrifugal means comprising weights pivoted by internally screw-threaded bushes mounted upon externally screw-threaded studs secured to one of the planetary cages, the bushes pressing upon the other planetary cage and serving to move the cages apart against the action of a loading spring which serves to urge the cages together so far as the pivoting of the weights permits.

In testimony whereof we affix our signatures.

CHARLES SCOTT PRENDERGAST.
RICHARD SAMUEL PRENDERGAST.